United States Patent [19]

Brouillard

[11] Patent Number: 5,358,636
[45] Date of Patent: Oct. 25, 1994

[54] APPARATUS FOR THE TREATMENT OF WASTE SLUDGE

[76] Inventor: Gaétan Brouillard, 341 chemin Brouillard, Route 249, St-Georges de Windsor, Quebec, Canada, J0A 1J0

[21] Appl. No.: 62,744
[22] Filed: May 18, 1993
[51] Int. Cl.$^5$ .......................................... C02F 11/02
[52] U.S. Cl. .................... 210/207; 210/218; 210/220
[58] Field of Search ............. 210/609, 620, 188, 205, 210/207, 708, 218, 220, 241, 320, 532.2

[56] References Cited

U.S. PATENT DOCUMENTS

| | | | |
|---|---|---|---|
| 3,574,331 | 4/1971 | Kurosawa | 210/195 |
| 3,695,439 | 10/1972 | Dupre | 210/207 |
| 3,807,563 | 4/1974 | Reid, Jr. | 210/139 |
| 3,813,851 | 6/1974 | Eder | 55/52 |
| 3,997,437 | 12/1976 | Prince et al. | 210/4 |
| 4,259,182 | 3/1981 | Belveal | 210/629 |
| 4,263,137 | 4/1981 | Kos | 210/800 |
| 4,346,000 | 8/1992 | van Drooge | 210/207 |
| 4,576,719 | 3/1986 | Hurley et al. | 210/620 |
| 4,624,791 | 11/1986 | Ferriss | 210/220 |
| 4,647,372 | 3/1987 | Condolios | 210/220 |
| 4,938,867 | 7/1990 | Long | 210/220 |
| 4,994,179 | 2/1991 | Keeter et al. | 210/195.1 |
| 5,030,353 | 7/1991 | Stuth | 210/615 |
| 5,055,204 | 10/1991 | Bogart | 210/758 |

OTHER PUBLICATIONS

*Biological Reclamation of Solid Wastes*, by Clarence G. Golueke, Rodale Press, Emmaus, Pa., 1977, pp. 117–122.
*Sluge Treatment*, by W. Wesley Eckenfelder, Jr. & Chakra J. Santhanam, Marcel Dekker, Inc., New York, 1981, pp. 95–105.
*Dewatering Municipal Wastewater Sludges*, by Orris E. Albertson, et al Noyes Data Corporation, Park Ridge, New Jersey, 1991, pp. 12–23.

Primary Examiner—Thomas Wyse
Attorney, Agent, or Firm—Antonelli, Terry, Stout & Kraus

[57] ABSTRACT

The invention relates to an apparatus for the treatment of waste sludge. The apparatus comprises as its main feature a vertically extending housing unit having a height/width ratio sufficient to provide separate zones in the housing unit, including a settling zone for thickened sludge, a mid-level buffer zone for waste sludge containing solid matter in suspension and a supernatant treatment zone for supernatant treatment. The housing unit also has an inclined bottom with a slope sufficient to cause a lateral and a gravity force to be exerted by the solid matter in the sludge along the inclined bottom to yield a thickened sludge at the settling zone of the housing unit and a supernatant liquid having a reduced solid content at the supernatant treatment zone of the housing unit. The height/width ratio of the housing unit is important to provide the three zones referred to above by which treatment of the supernatant can be conducted in the supernatant treatment zone with minimal disturbance to the settling zone. The sloped bottom provides a geometry which improves sludge accumulation and evacuation, with minimal dilution.

11 Claims, 2 Drawing Sheets

5,358,636

APPARATUS FOR THE TREATMENT OF WASTE SLUDGE

FIELD OF THE INVENTION

The invention relates to the treatment of waste sludge, particularly sludge from waste water treatment plants or septic tanks containing solid matter. More particularly, the invention related to an apparatus for the treatment of waste sludge preferably containing about 5% of solid matter or less. The method and apparatus of the present invention provide means to conduct a rapid primary separation of solids from liquid sludges, thereby enabling secondary treatment on the supernatant. This yields thickened sludge and a supernatant which are suitable for further treatment or disposition.

BACKGROUND OF THE INVENTION

The treatment of waste sludge containing a certain percentage of solids has in the past been approached in various ways. In some operations, separate units to thicken the sludge are not provided and, hence, what is used is a primary treatment unit to co-settle and thicken raw primary and waste secondary solids.

Many of the problems associated with the use of a primary clarifier as a thickener are the results of excessive solid retention time in the clarifier. Different designs of thickeners have been suggested in an attempt to overcome this problem and to efficiently accumulate suspension solids in effluents. The thickeners suggested so far have as a common feature a sloped conical bottom. However, systems allowing for quick settling of waste sludges are yet to be developed.

Attempts have also been made to treat sludges containing a certain amount of organic matter by creating a turbulence within the entire volume of the treatment apparatus to allow for constant mixing of the solids contained in the sludge. As a result, the supernatant liquid is treated but mixing of the entire sludges is required. This type of system does not avoid the necessity of accumulating non-degraded waste solids once digestion of the sludge has been performed. As the treatment apparatus in that case is usually not designed for accumulating and recuperating solids, the procedure can become lengthy and expensive.

SUMMARY OF THE INVENTION

According to the present invention, there is provided an apparatus for waste sludge treatment. The apparatus comprises a vertically extending housing unit having a height/width ratio sufficient to provide separate zones in the housing unit including a settling zone for thickened sludge, a mid-level buffer zone for waste sludge containing solid matter in suspension and a supernatant treatment zone for supernatant treatment. Preferred is a height/width ratio of at least 3. The housing unit has an inclined bottom with a slope sufficient to cause a lateral and a gravity force to be exerted by the solid matter in the sludge along the inclined bottom to yield a thickened sludge at the settling zone of the housing unit and a supernatant liquid having a reduced solid content at the supernatant treatment zone of the housing unit. A sludge inlet is provided for feeding the waste sludge into the housing unit. The sludge inlet is located substantially in the lower bottom portion of the mid-level buffer zone in the housing unit. Also provided is a thickened sludge outlet substantially at the base of the housing unit. The apparatus also includes a diffusing device for providing air in the supernatant treatment zone with minimal disturbance in the settling zone. The diffusing device is located in the housing unit to provide air in the form of fine bubbles only in the supernatant treatment zone to minimize destabilization of the thickened sludge. Also provided is at least one supernatant outlet located at variable positions in the supernatant treatment zone of the housing unit.

Optional elements of the apparatus of the present invention include a deflector below the sludge inlet for providing uniform distribution of the solid matter contained in the waste sludge introduced in the housing unit through the sludge inlet towards the settling zone of the housing unit. A preferred embodiment of the deflector is a perforated plate. Another optional element of the apparatus of the present invention is a cover on the housing unit to control odors which can be supplemented by an odor treatment device.

It has been found that a sloped bottom is particularly efficient to separate solid matter from the waste sludge through the lateral force exerted by the particles towards the bottom of the housing unit. It has also been found that the sloped bottom provides a geometry which improves sludge accumulation and evacuation, with minimal dilution. The sloped bottom also provides for position of the sludge outlet at the side of the housing unit for easier access. This facilitates maintenance and repairs.

The height/width ratio of the housing unit is also important to provide the three zones referred to above by which treatment of the supernatant can be conducted in the supernatant treatment zone with minimal disturbance to the settling zone and to provide gravity force which, when combined to the lateral force imparted by the sloped bottom, yield conditions favoring optimal thickening of solid matter in reduced periods of time.

Also within the scope of the present invention is a method for the treatment of waste sludges. The method comprises introducing waste sludge to be treated in a vertically standing housing unit having a height/width ratio sufficient to provide separate zones in the housing unit, including a settling zone for thickened sludge, a mid-level buffer zone for waste sludge containing solid matter in suspension and a supernatant treatment zone for supernatant treatment. The housing unit has an inclined bottom with a slope sufficient to cause a lateral and a gravity force to be exerted by the solid matter in the waste sludge along the inclined bottom to yield a thickened at the settling tone of the housing unit and a supernatant having a reduced solid content at the supernatant treatment zone of the housing unit. The solid matter in the waste sludge is allowed to be deposited in the settling zone. The solid-liquid separation thus accomplished allows the formation of a supernatant in the supernatant treatment zone. The supernatant in the supernatant treatment zone is treated and evacuated from the supernatant treatment zone of the housing unit. The thickened sludge is evacuated from the settling zone of the housing unit.

Preferably, the waste sludge to be treated in accordance with the process of the present invention contains about 5% of dry solids or less, more preferably between 2 and 4% of dry solids. The waste sludge to be treated can also be seeded with bacterial strains having the ability to degrade contaminants present in the waste sludge or a flocculating agent can be added to the waste sludge prior to feeding the waste sludge in the housing unit. Also, the treatment of the supernatant in the supernatant treatment zone can be enhanced by providing oxygen in the treatment zone, preferably in the form of fine bubbles at a rate of 2.5 kg of oxygen per kg of BOD.

The waste sludge to be treated according to the method of the present invention can be fed in the housing unit in a continuous process at a preferred rate that results in a residence time ranging between 1 and 4 hours, or fed in the housing unit in a batch process in which the solid matter is allowed to be deposited in the settling zone over a period of time ranging between 6 and 24 hours to yield a thickened sludge in the settling zone and a supernatant in the treatment zone. In both continuous and batch processes, the supernatant preferably contains less than 1% of dry solids.

DESCRIPTION OF THE DRAWINGS

FIG. 2c is a side sectional view of the diffusing device shown in FIG. 2a.

DESCRIPTION OF PREFERRED EMBODIMENTS

The present invention relates to an apparatus for the treatment of waste sludge comprising a low percentage of solid particles. Preferred waste sludge to be treated contain about 5% dry solids or less. Examples include waste sludge from sewers or septic tanks. The term "treatment of waste sludge", when used in the context of the present invention, is intended to designate an intervention on waste sludge which includes settling and physico-chemical treatment of solid matter present in the sludge and the creation of a supernatant in which remaining organic matter is biologically degraded to yield a supernatant having a reduced percentage of solids which generally meets government standards.

The apparatus of the present invention allows for a rapid thickening of waste sludge by the use of an inclined bottom having a slope sufficient for obtaining both lateral and gravity forces on the solid matter contained in the waste sludge, thereby increasing thickening rates. The supernatant from which most solid matter has been removed is treated by bacterial treatment which is accelerated by providing air in the supernatant through a diffusing device. In this regard, the position of the diffusing device is important and should be such as to avoid unnecessary destabilization of the mass of solids forming the thickened sludges which accumulate at the bottom of the apparatus.

Figure 1:
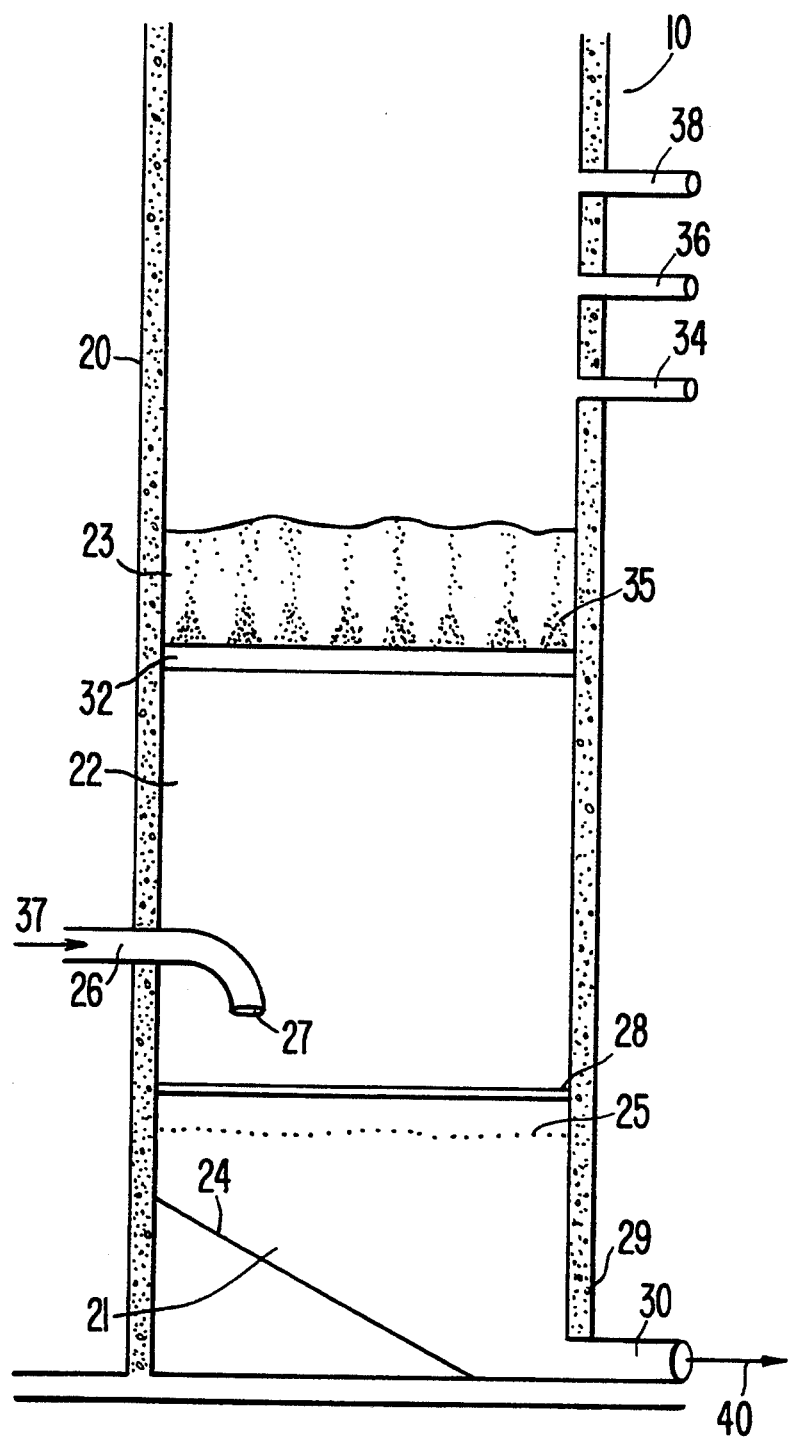
FIG. 1 is a side view in section of one embodiment of the apparatus of the invention.

Referring now to FIG. 1, the apparatus for the treatment of waste sludge, generally designated by reference numeral 10, comprises a housing unit 20 for the reception and treatment of the waste sludge. Housing unit 20 preferably has the shape of a cylinder. While the dimensions of housing unit 20 may vary depending on the amount of matter to be treated, housing unit 20 preferably has a height/width ratio equivalent to at least 3. A ratio of this type is necessary to obtain a sufficient load and to provide at least three separate zones in the housing unit that favor efficient separation of solid matter from the sludge as well as appropriate treatment of the supernatant. The zones include settling zone 21, the upper limit of which is defined by dotted line 25, mid-level buffer zone 22, the upper limit of which is defined by diffusing device 32, and supernatant treatment zone 23 above diffusing device 32. Housing unit 20 tan be made of various materials depending on the composition of the sludge to be treated. Preferred materials include various types of polyethylenes as well as stainless steel or concrete with an epoxy coating.

Housing unit 20 has a sloped bottom 24. Sloped bottom 24 has an angle that is sufficient to obtain both a lateral force and a gravity force permitting the rapid thickening of the waste sludge in settling zone 21. In this regard, it has been found that an angle of at least 30° is necessary to obtain proper results.

Sludge inlet 26 is located in the lower portion of mid-level buffer zone 22 of housing unit 20. A preferred embodiment of sludge inlet 26 is L-shaped with inlet 27 oriented towards the settling zone of housing unit 20. This shape favors rapid thickening of the waste sludge introduced in the housing unit while minimizing upward solid disturbance.

A more uniform distribution of the waste sludge can be achieved through the use of perforated deflector plate 28 provided below sludge inlet 26 immediately above settling zone 21. In the batch treatment of waste sludge, waste sludge is fed through sludge inlet 26 at a substantive pressure. In this situation, deflector plate 28 becomes important in order to avoid the creation of unnecessary disturbance in settling zone 21. During a continuous treatment, the flow of incoming sludge is less important and the use or deflector plate 28 can be omitted.

Thickened sludge is evacuated from housing unit 20 through thickened sludge outlet 30 located on side panel 29 of housing unit 20. As mentioned previously, the configuration of sloped bottom 24 allows sludge outlet 30 to be positioned in such a manner that maintenance and repairs of housing unit 20 can be easily conducted.

Also within housing unit 20 is diffusing device 32 used to provide suitable aeration to the supernatant in supernatant treatment zone 23. The position of diffusing device 32 can be varied depending on the percentage of solid matter present in housing unit 20. Diffusing device 32 defines the bottom of treatment zone 23.

A preferred type of diffusing device 32 used in the context of the present invention is a diffusing device which provides an oxygen transfer rate of about 10%. This type of diffusing device is referred to in the art as a fine bubble diffusing device.

Figure 2A:
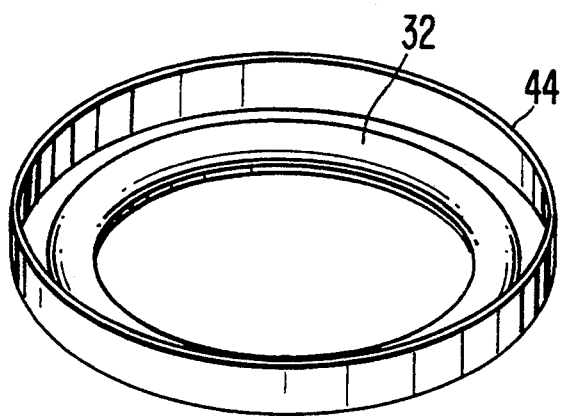
FIG. 2a is a plan view of one embodiment of a diffusing device of the apparatus of the invention.
Figure 2C:
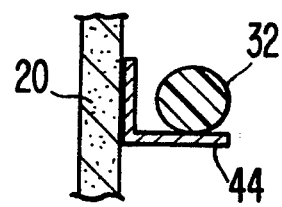
Figure 2B:
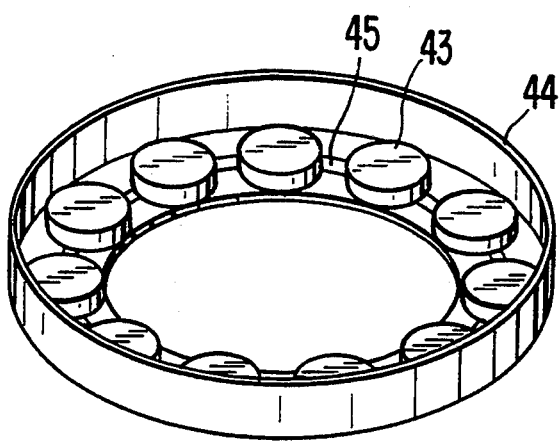
FIG. 2b is a plan view of another embodiment of a diffusing device of the apparatus of the invention.
Figure 2D:
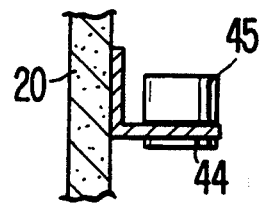
FIG. 2d is a side sectional view of the diffusing device shown in FIG. 2b.

FIGS. 2a, 2b, 2c and 2d show preferred embodiments of diffusing devices. In FIG. 2a, diffusing device 32, also shown in the embodiment of FIG. 1, has the shape of a ring and includes a continuous circular porous membrane 42 made of neopren. In FIG. 2b, diffusing device 45 comprises a plurality of connected individual membrane diffusers 43. Both diffusing devices 32 and 45 rest on support 44 as shown in FIGS. 2c and 2d respectively. Support 44 is attached to the inside of housing unit 20 and can be moved upwardly or downwardly to vary the position of diffusing device 32 or 45 in housing unit 20.

The use of a fine bubble diffusing device is important because it provides a weak turbulence in treatment zone 23 (see FIG. 1) caused by the displacement of water masses created by the rising air 35. This weak turbulence enhances the efficiency of the biological treatment of the supernatant. The air distributed in housing unit 20 through diffusing devices 32 or 45 provided by a compressor (not shown). The amount of air present in the system varies with the type and amount of waste sludge to treat. As a general rule, the system requires approximately 2.5 kg of oxygen per kg of BOD (Biological Oxygen Demand).

Referring back to FIG. 1, supernatant outlets 34, 36 and 38 are also provided in housing unit 20 to evacuate the treated supernatant. The choice of either outlet 34, 36 or 38 depends on the amount of organic matter required in the supernatant after treatment.

When it is desired to operate the apparatus of the present invention, waste sludge is admitted in housing unit 20 through sludge inlet 26 as indicated by arrow 37 until housing unit 20 has been filled to an operational level. The amount of sludge introduced in the housing unit 20 can vary depending on the residence time required to effect the appropriate thickening. Preferably, housing unit 20 is filled at about 60% of its capacity for waste sludge containing between 2 and 4% of dry solids.

The process by which waste sludge is treated in the apparatus of the present invention can be either a continuous or a batch process. In the case of a continuous process, the waste sludge is fed at a rate that results in a residence time ranging between 1 and 4 hours for waste sludge containing between 2 and 4% of dry solids. In the case of a batch process, the residence time within housing unit 20 to provide a supernatant containing less than 1% of dry solids usually varies between 6 and 24 hours. Variations in residence time are function of the nature of the solids found in the waste sludge.

To improve the thickening of solid matter present in the waste sludge, the addition of a flocculating agent is advisable. Examples of flocculating agents that can be used in the context of the present invention include Percol 757 by Allied Colloids and Dearborn 6413. The dosage of the flocculant varies depending on the nature of the solid particles present in the sludge, with 2 kg per ton of solid matter being a preferred minimum.

The waste sludge to be treated can also be seeded with bacterial strains having the ability to degrade the contaminants present in both the thickened sludge and the supernatant. However, as only the supernatant is provided with aeration conditions sufficient to favor bacterial growth, aerobic bacterial decontamination is more efficient in the supernatant than it is in the thickened sludge. In order to overcome this problem, both anaerobic and aerobic bacterial strains can be introduced in the waste sludge prior to treatment. The anaerobic strains act more readily on the thickened sludge and the aerobic strains act more readily on the supernatant. The amount and frequency at which the waste sludge is seeded with microorganisms varies depending upon the nature of the contaminants.

The waste sludge thickens in settling zone 21 and a supernatant is formed in supernatant treatment zone 23. At this stage, the treatment of the supernatant, which has already been Seeded with appropriate bacterial strains incorporated in the waste sludge prior to its introduction in housing unit 20, can be conducted by providing air through operation of diffusing device 32. The position of diffusing device 32 can be varied depending upon the percentage of solids present in the waste sludge to be treated. During the treatment of the supernatant, buffer zone 22 acts to shield the thickened sludge accumulated in settling zone 21 from any possible turbulence arising from the aeration of the supernatant in treatment zone 23.

If the apparatus of the present invention is operated in a batch process, once the treatment of the supernatant has been completed, the thickened sludge is removed from housing unit 20 through thickened sludge outlet 30, as exemplified by arrow 40. An additional volume of waste sludge is then introduced in housing unit 20 through sludge inlet 26. This causes the volume of waste sludge present in housing unit 20 to raise to the level of supernatant outlet 34, 36 or 38, whereby treated supernatant is released from outlet 34, 36 or 38 and collected for further treatment if necessary.

In the case of a continuous process, the level of waste sludge is constantly maintained at supernatant outlet 34, 36 or 38 by constantly removing a volume of thickened sludge through thickened sludge outlet 30 and a volume of treated supernatant through supernatant outlet 34, 36 or 38 while constantly adding a volume of waste sludge through sludge inlet 26. The volume of waste sludge introduced in housing unit 20 through sludge inlet 26 is equal to the sum of the volume of supernatant released through supernatant outlet 34, 36 or 38 and the volume thickened sludge evacuated through thickened sludge outlet 30.

I claim:

1. An apparatus for the treatment of waste sludge, said apparatus comprising:

a vertically extending housing unit having a height/width ratio sufficient to provide separate zones in said housing unit, including a settling zone for thickened sludges, a mid-level buffer zone for waste sludge containing solid matter in suspension and a supernatant treatment zone for supernatant treatment, said housing unit having an inclined bottom with a slope sufficient to cause a lateral and a gravity force to be exerted by solid matter in said sludge along said inclined bottom to yield a thickened sludge at said settling zone of said housing unit and a supernatant liquid having a reduced solid content at said supernatant treatment zone of said housing unit;

a sludge inlet for feeding said waste sludge into said housing unit, said sludge inlet being located at substantially in the lower portion of said buffer mid-level housing zone in said housing unit;

a thickened sludge outlet substantially at the base of said housing unit;

a diffusing device for providing air in said supernatant treatment zone with minimal disturbance in said settling zone; and a supernatant outlet located at variable positions in said supernatant treatment zone of said housing unit.

2. An apparatus according to claim 1, wherein said housing unit has a height/width ratio of at least 3.

3. An apparatus according to claim 1, further comprising a deflector below said sludge inlet for providing uniform distribution of said solid matter contained in said waste sludge introduced in said housing unit through said sludge inlet towards said settling zone of said housing unit.

4. An apparatus according to claim 3, wherein said deflector comprises a perforated plate below said sludge inlet.

5. An apparatus according to claim 1, wherein said housing unit comprises a cover and an odor treatment device.

6. An apparatus according to claim 1, wherein the angle of said inclined bottom is at least 30 degrees.

7. An apparatus according to claim 1, wherein said sludge inlet is L-shaped with an inlet oriented towards said settling zone of said housing unit for rapid thickening of said waste sludge introduced in said housing unit and minimal upward solid disturbance.

8. An apparatus according to claim 1, wherein said diffusing device is a fine bubble diffusing device providing an oxygen transfer rate of about 10%.

9. An apparatus according to claim 8, wherein said diffusing device is ring-shaped and includes a continuous circular porous membrane or a plurality of connected individual membrane diffusers.

10. An apparatus according to claim 9, wherein said diffusing device rests on a support attached to said housing unit, said support being adapted to be moved upwardly or downwardly to vary the position of said diffusing device in said housing unit.

11. An apparatus according to claim 1, wherein said supernatant outlet comprises three equidistant supernatant outlets.

* * * * *